United States Patent [19]
Heisch

[11] Patent Number: 5,689,712
[45] Date of Patent: Nov. 18, 1997

[54] PROFILE-BASED OPTIMIZING POSTPROCESSORS FOR DATA REFERENCES

[75] Inventor: Randall Ray Heisch, Austin, Tex.

[73] Assignee: International Business Machines Corporation, Armonk, N.Y.

[21] Appl. No.: 280,910

[22] Filed: Jul. 27, 1994

[51] Int. Cl.$^6$ .................. G06F 9/44; G06F 9/45
[52] U.S. Cl. ............. 395/704; 395/709; 395/183.11; 395/183.14
[58] Field of Search ............ 395/183.11, 183.14, 395/700, 704, 709

[56] References Cited

U.S. PATENT DOCUMENTS

| | | | |
|---|---|---|---|
| 5,303,377 | 4/1994 | Gupta et al. | 395/700 |
| 5,313,634 | 5/1994 | Eickemeyer | 395/700 |
| 5,335,344 | 8/1994 | Hastings | 395/575 |
| 5,465,258 | 11/1995 | Adams | 395/700 |

OTHER PUBLICATIONS

"Profile Guided Code Positioning", Pettis et al., Proc. of the ACM Sigplan '90 Conf. on Prog. Lang. Designed Implementation, Jun. 1990, pp. 16–27.

*Primary Examiner*—Kevin A. Kriess
*Assistant Examiner*—Kakali Chaki
*Attorney, Agent, or Firm*—Diana L. Roberts; Andrew J. Dillon

[57] ABSTRACT

The present invention is a system and process for optimizing programs, having memory references, at the object code level. The process includes the computer-implemented steps of instrumenting each of the memory references to create an instrumented program, executing the instrumented program to capture effective address trace data for each of the memory references, analyzing the access patterns of the effective address trace data and, in response, reordering the memory references to create an optimized program.

12 Claims, 7 Drawing Sheets

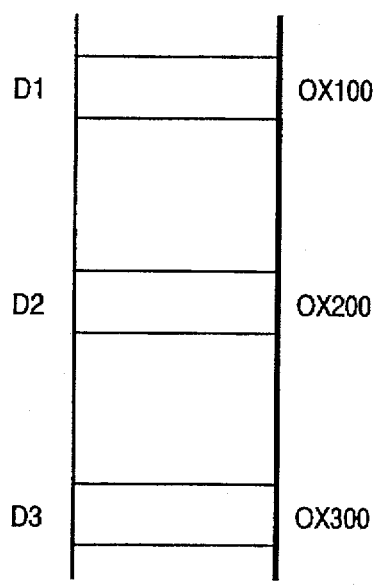
FIG. 9a
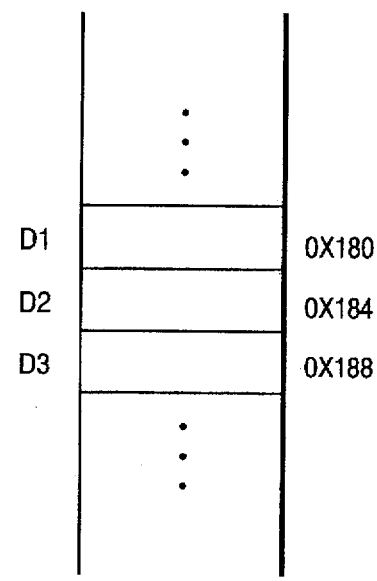
FIG. 9d
L1
   l  r3, 0X100   ; D1
   l  r4, 0X200   ; D2
   a  r5, r3, r4
   s  r5, 0X300   ; D3
   bne L1
FIG. 9b
L1
   l  r3, 0X180
   l  r4, 0X184
   a  r5, r3, r4
   s  r5, 0X188
   bne L1
FIG. 9e
DATA REORDER LIST
.
.
( D1 )  0X100  0X180
( D2 )  0X200  0X184
( D3 )  0X300  0X188
.
.
FIG. 9c

200, 800, 100, 800, 400, 200, 800, 400, 200, 800, 400, 200, 800, 400, 200, 800, 400, 200, 800, 400, 200, 600, 200, 600, 200, 700

PROFILE-BASED OPTIMIZING POSTPROCESSORS FOR DATA REFERENCES

BACKGROUND OF THE INVENTION

1. Field of the Invention

The present invention relates to improvements in software optimizers and, more particularly, to a profile-based postprocessor for data references.

2. Background Information

FIG. 1 illustrates a typical memory hierarchy, which includes central processing unit ("CPU") 130, instruction/data cache 140, random access memory ("RAM") 150, and disk memory 160. CPU 130 typically retrieves instructions and/or data directly from cache 140, which is the fastest, smallest, and most expensive storage device. Cache 140 allocates its memory space in groups of cache lines. For example, cache 140 could allocate sixteen words per cache line and have 64 lines. As such, CPU 130 would load, from RAM 150, 64 groups of 16 contiguously positioned words into cache 140.

The improved performance offered by cache memory is due primarily to a program characteristic referred to as "locality of reference". This implies that a program usually references data or instruction memory in confined, physically close groups. A program which exhibits good "locality of reference" for either data or instruction memory references will usually realize improved performance when cache memory is present.

Cache memory 140 is usually direct mapped, n-way set associative, or fully associative. Due to the expense of implementing a fully associative cache, cache memory 140 is typically either direct mapped or n-way set associative. FIG. 3a illustrates a 2-way set associative cache. A 2-way set associative cache has two sets of memory (i.e. set0 310 and set1 320) for each cache address. As shown in FIG. 3b, two real addresses 330 can share the same cache address 340, which reduces the probability of a cache miss and thus improves performance. A cache miss occurs when a memory reference does not find its data in the cache and usually results in a 10× or more cycle time penalty.

A cache performance problem arises when CPU 130 must repeatedly access memory locations that are separated by the approximate size of the cache set (e.g., not exhibiting good locality of reference). For example, FIG. 4a illustrates a tight program loop with 3 memory references (two loads 402 and 404 and one store 406). In this loop, memory location D1 (see FIG. 4b) is loaded into register r3 (not shown) and location D2 (see FIG. 4b) is loaded into register r4 (not shown). Registers r4 and r5 are added together and saved in register r5 (not shown). Register r5 is then stored into the memory at location D3. The program then loops until register r5 contains the value zero.

The allocation of memory is shown in FIG. 4b and assumes that the three memory locations (D1, D2, and D3) are separated by the size of the cache set. Under these conditions, FIG. 4d illustrates that real memory address D1, D2, and D3 all map to the same cache address (n). Because the cache is 2-way set associative, as shown in FIG. 4c, there is only room for 2 memory values at cache address n and, therefore, this code sequence suffers extreme performance degradation due to constant cache "conflict" misses on every memory reference throughout the duration of the loop.

Further, cache memory is usually allocated by the cache line which is typically much larger than a single data item. Each reference to sparse or non-local data items results in the allocation of a full cache line. The additional data items brought into the cache, but not used, degrade cache utilization efficiency, increase cache misses, and reduce overall performance.

To reduce the chance of cache misses, memory locations which are accessed together in code loops should be grouped together as close as possible.

Conventional tools exist that attempt to optimize the program at compile time. However, most users only have access to executable code (i.e. object code) and the compiler does not usually have information on how the program actually executes. Therefore, there is a great need for a performance tool that performs the above optimizing techniques at the object code level. Such a "postprocessor" should be capable of dynamically profiling the program at the object code level, analyzing memory reference patterns and then restructuring the memory allocation in the program to optimize performance without altering functionality.

SUMMARY OF THE INVENTION

It is an object of the present invention to provide a system and process for optimizing a program, having memory references, at the object code level. Specifically, the process includes the computer implemented steps of instrumenting each of the memory references to create an instrumented program, executing the instrumented program to capture effective address trace data for each of the memory references, analyzing the access patterns of the effective address trace data, and in response to the analyzing step, reordering the memory references to create an optimized program.

The system includes a processor, memory, means for controlling the processor to instrument each of the memory references to create an instrumented program, means for controlling the processor to execute the instrumented program to capture effective address trace data for each of the memory references, means for controlling the processor to analyze access patterns of the effective address trace data, and in response to analyzing the access patterns, means for controlling the processor to reorder the memory references to create an optimized program.

BRIEF DESCRIPTION OF THE DRAWINGS

FIGS. 9a–9e illustrate an example code sequence and data memory address assignment both before and after the restructuring process.

DETAILED DESCRIPTION OF THE PREFERRED EMBODIMENT

Figure 2:
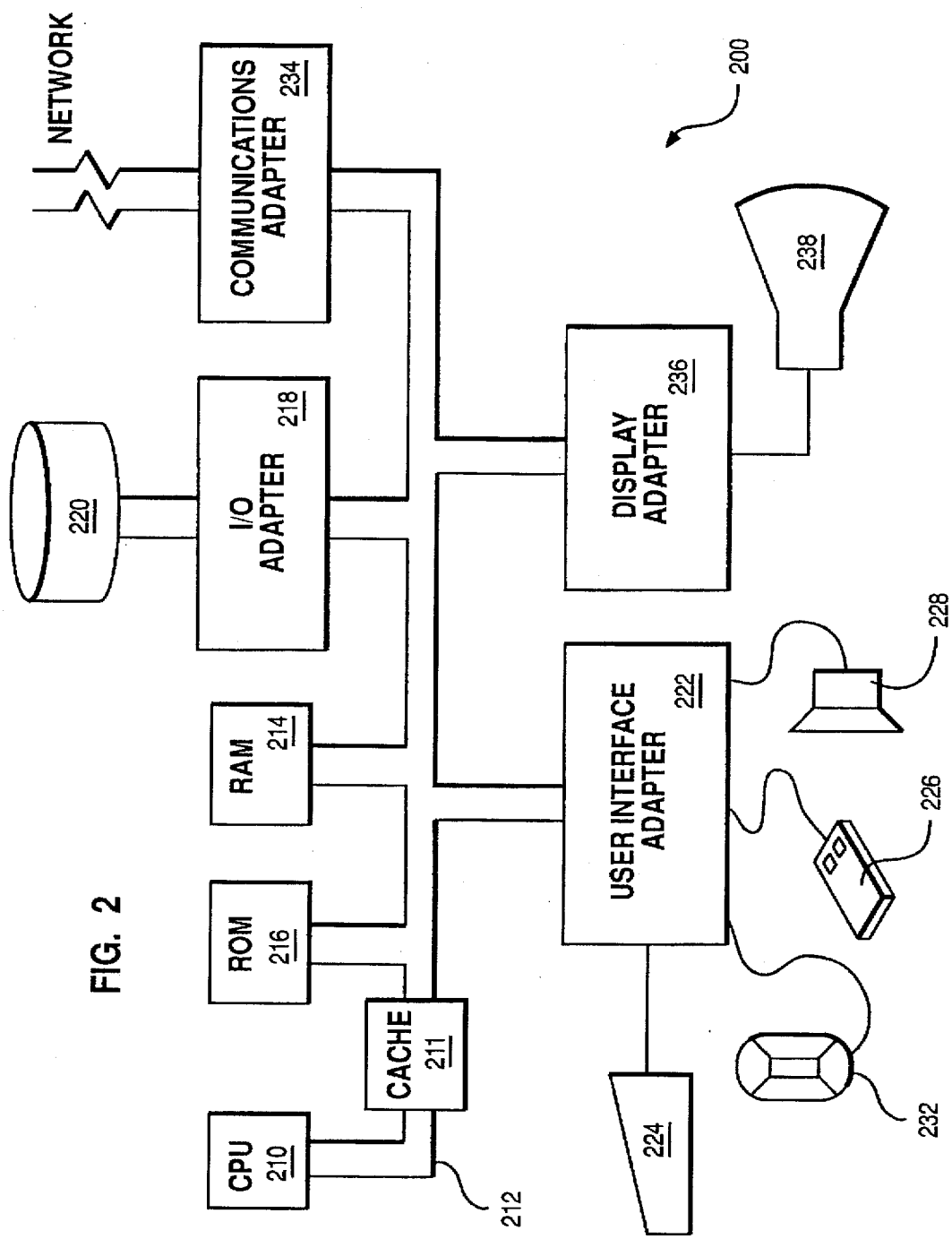
FIG. 2 is a schematic diagram of hardware for use with the present invention.
Figure 1:
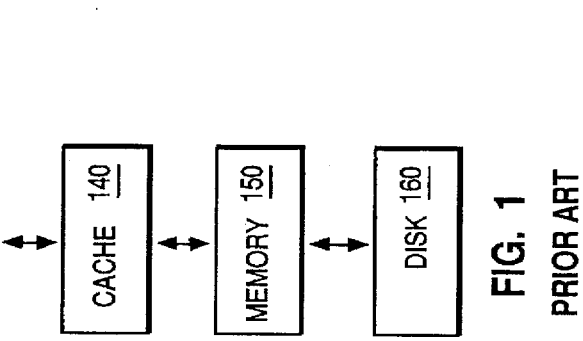
FIG. 1 is a prior art pictorial view of a memory hierarchy for a computer system.
Figure 3A:
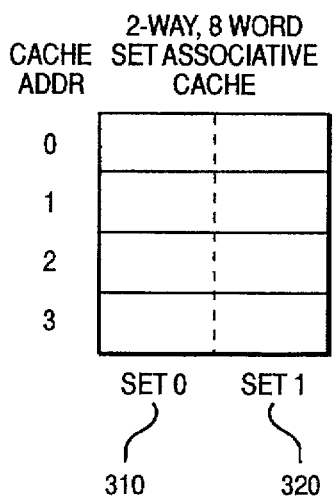
FIG. 3a is a prior art pictorial view of a set associative cache.
Figure 3B:
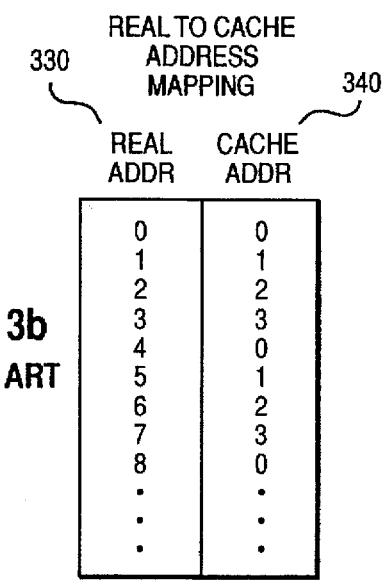
FIG. 3b illustrates its related real-to-cache address mapping.
Figure 4A:
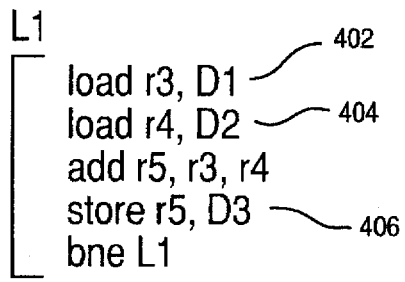
FIG. 4a is a prior art pictorial view of a code sequence.
Figure 4B:
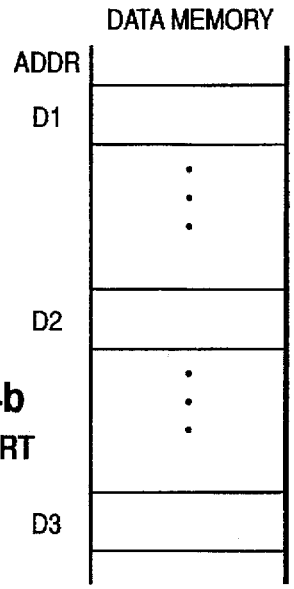
FIG. 4b is a prior art pictorial view of a data memory allocation.
Figure 4C:
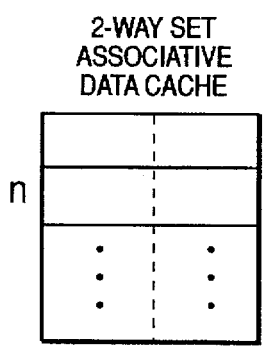
FIG. 4c is a prior art pictorial view of an set associative cache.
Figure 4D:
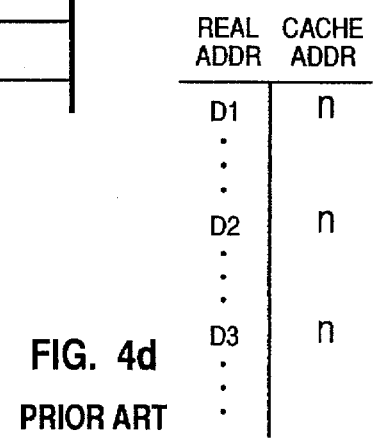
FIG. 4d is a prior art pictorial view of a cache address mapping which depicts the performance problem resulting from poor program locality.

The preferred embodiment includes a system and process for optimizing programs at the object code level. The preferred embodiment is preferably practiced in a suitable representative hardware configuration, such as the hardware configuration illustrated in FIG. 2.

Workstation 200 includes any suitable central processing unit 210, such as a conventional microprocessor, and a number of other units interconnected via system bus 212. Illustratively, workstation 200 comprises Random Access Memory (RAM) 214, Read Only Memory (ROM) 216, cache 211, display adapter 236 for connecting system bus 212 to display device 238, and I/O adapter 218 for connecting peripheral devices (e.g. disk and tape drives 220) to system bus 212. Workstation 200 further comprises user interface adapter 222 for connecting keyboard 224, mouse 226, speaker 228, microphone 232, and/or other user interface devices, such as a touch screen device (not shown), to system bus 212. Communication adapter 234 connects workstation 200 to a data processing network.

The preferred embodiment includes a postprocessor which resides within a machine-readable media to direct the operation of workstation 200. Any suitable machine-readable media may retain the postprocessor, such as RAM 214, ROM 216, a magnetic diskette, magnetic tape, or optical disk (the last three being located in disk and tape drives 220). The postprocessor controls CPU 210 to copy, instrument (described herein), execute, analyze, and restructure a program. For ease in explanation, the following specification describes the postprocessor as performing those various tasks. In actuality, the postprocessor merely controls and directs CPU 210 to perform those tasks.

Figure 5:
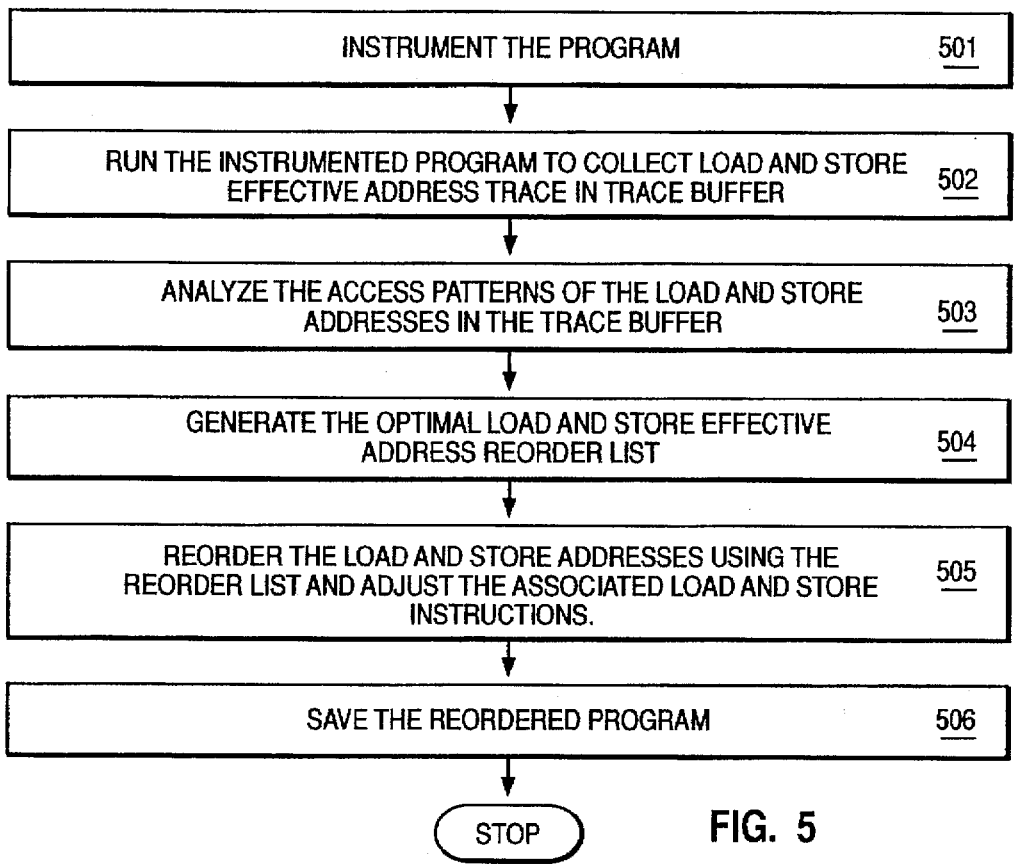
FIG. 5 is a flow chart of the overall restructuring process.

FIG. 5 illustrates an overall process of data restructuring. At 501, the postprocessor instruments memory references (e.g. data references) in a program (described herein). At 502, the postprocessor executes the instrumented program using a desired workload (e.g., for a typical usage) and captures the effective address of each memory reference (i.e. load or store instruction) as trace data in a trace buffer. At 503, the postprocessor processes and analyzes the trace data to determine access patterns of the load and store addresses (herein referred to as "memory address reference patterns") for the selected workload.

At 504, the postprocessor uses the analysis in 503 to generate an optimal memory address allocation reorder list. This reorder list indicates an optimal ordering for the data items in the program based upon how they are referenced during program execution. At 505, the postprocessor uses the reorder list to adjust all memory reference instructions in the program so that they will correctly reference the data using the new, reordered address assignments. The postprocessor saves the reordered program at 506.

Figure 6:
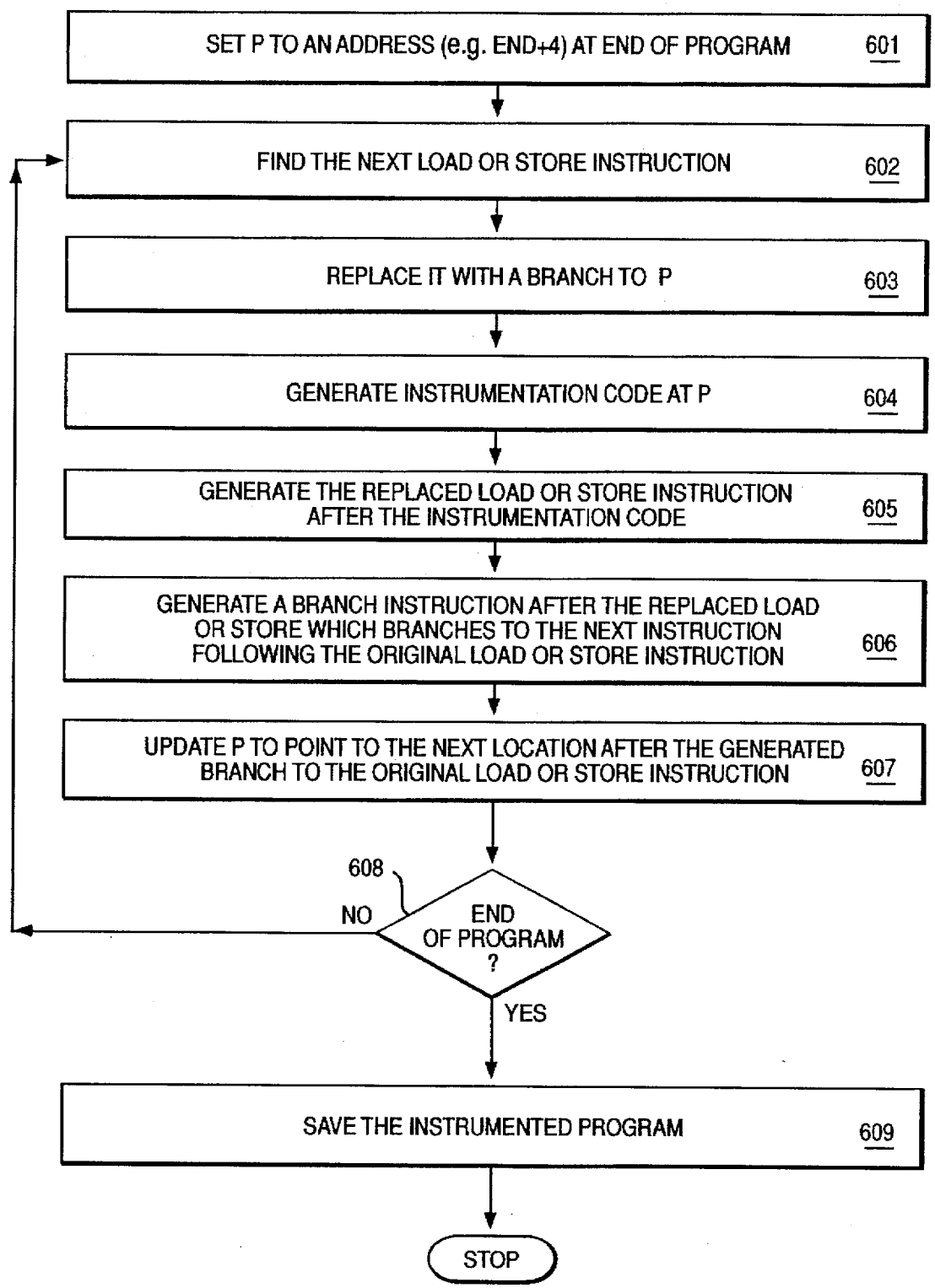
FIG. 6 is a flow chart describing the program instrumentation phase.

The instrumentation phase at 501 is expanded in FIG. 6. Instrumenting the executable is required to collect the memory reference address patterns. These patterns determine which data variables are referenced together. Instrumentation involves patching every load and store (l/s) instruction in the program with code that calculates and then stores the reference address for each l/s instruction in a trace buffer. The postprocessor appends all instrumentation code to the end of the program starting at the last available address plus one instruction (4 bytes).

At 601, the postprocessor initializes a pointer, p, to the start of the instrumentation code at the end of the program. The beginning of the main loop of the instrumentation code starts with a search of the program for the next load or store instruction at 602. At 603, the postprocessor replaces the l/s instruction which is being instrumented with an unconditional branch to location p. At 604, the postprocessor generates instrumentation code (as detailed below) for the current l/s instruction at location p.

At 605, the postprocessor appends the current l/s instruction, which was replaced with the branch to p in 603, to the end of the instrumentation code. At 606, the postprocessor appends an unconditional branch back to the original code path immediately following the patched l/s to the instrumentation code. This preserves the original program behavior in the instrumented version of the program.

At 607, the processor updates the pointer p to point to the next available instrumentation code location immediately following the unconditional branch that was appended at 606. At 608, if there are more instructions in the program, instrumentation continues at 602 until no more load or store instructions are found. At that point, the postprocessor saves the fully instrumented program at 609 and the instrumentation process is complete.

Figure 7:
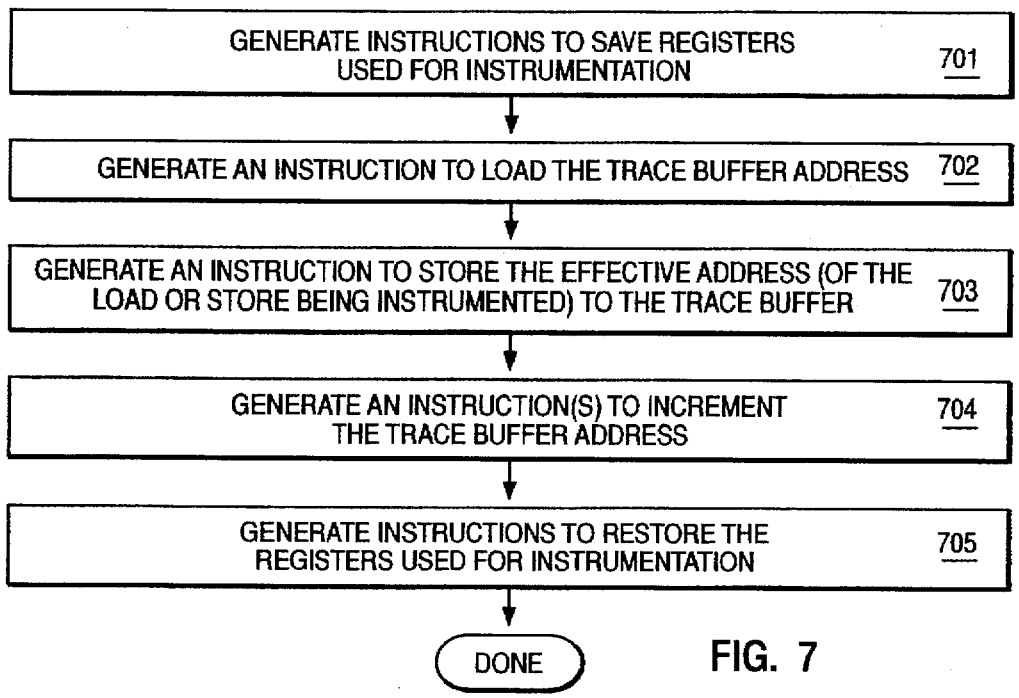
FIG. 7 is a flow chart describing the generation of instrumentation code.

The process for generating instrumentation code at 604 is shown in FIG. 7. At 701, the postprocessor generates the necessary instruction(s) for saving the current machine state. That is, the postprocessor generates instructions to save the contents of all registers that are used by the following instrumentation code. At 702, the postprocessor generates an instruction(s) to load the current trace buffer address pointer. At 703, the postprocessor extracts or calculates the effective address of the l/s instruction which is being instrumented. The postprocessor generates an instruction to store this effective address in the trace buffer (at the trace buffer address loaded in 702). Next, the postprocessor increments the trace buffer address pointer to the next trace buffer location at 704. Finally, the postprocessor generates the necessary instruction(s) to restore the machine state (registers) used for instrumentation at 705.

The following piece of code illustrates the above process:

```
End + 4:    Save contents of registers;
            1 r3,TA;         (Get trace buffer pointer address)
            St address, r3;  (store l/s address in trace buffer)
            a r3,r3,4;       (adjust trace buffer pointer address)
            st r3,TA;        (save new trace buffer pointer address)
            Restore Register;
            1 r3, address;   (do original l/s instruction)
            b inst + 4;      (branch to next instruction after l/s)
```

The postprocessor then executes the instrumented program in a typical manner. During execution of the instrumented program, the instrumented program writes the associated memory address of each executed load and store instruction to the trace buffer (502). Once the instrumented program has been thoroughly exercised, the postprocessor reads and analyzes the trace buffer to generate an optimal reorder list, which represents the preferred memory address allocation (503, 504). For example, the following frequently repeated trace data could reside in the trace buffer:

```
200, 800, 100, 800, 400, 200, 800, 400, 200
800, 400, 200, 800, 400, 200, 800, 400, 200
800, 400, 200, 600, 200, 600, 200, 700
```

Figure 10:
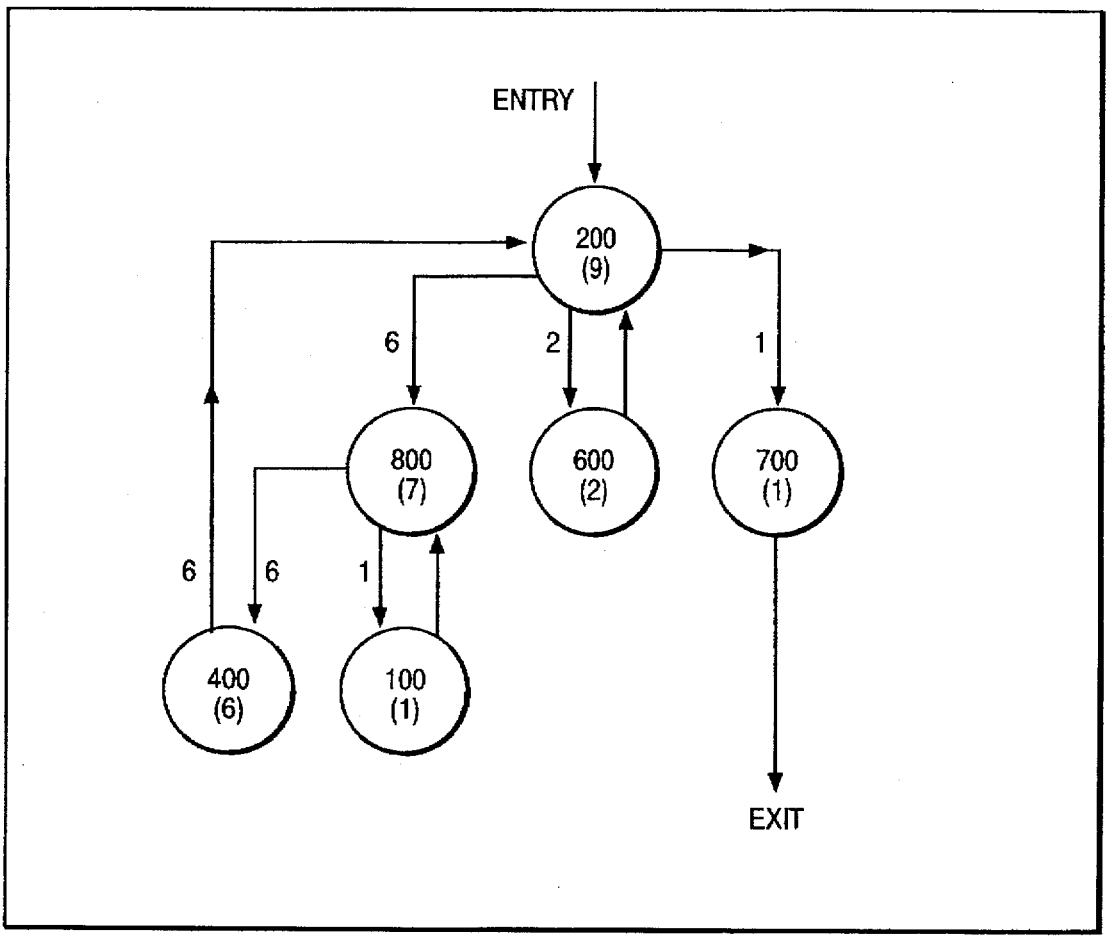
FIG. 10 is a pictorial view of a directed flow graph.

Using this trace data, the postprocessor generates a directed flow graph (DFG). Although DFGs are well known in the art, one short example of a DFG is illustrated in FIG. 10. In FIG. 10, the DFG illustrates that data address 200 was referred 9 times and data address 800 was next referenced six times, and so on. From this DFG, the processor generates an optimal reorder list indicating that the data variables at addresses 200, 800, and 400 should be placed close together in memory because they are referenced frequently and consecutively. As such, the postprocessor changes the addresses of those data variables so that they are positioned consecutively in memory.

In sum, the postprocessor traverses the DFG to find the most frequent and sequentially referenced data variables and generates an optimal reorder list therefrom. Alternately, one skilled in the art readily recognizes that other techniques may be used to generate the optimal reorder list.

Figure 8:
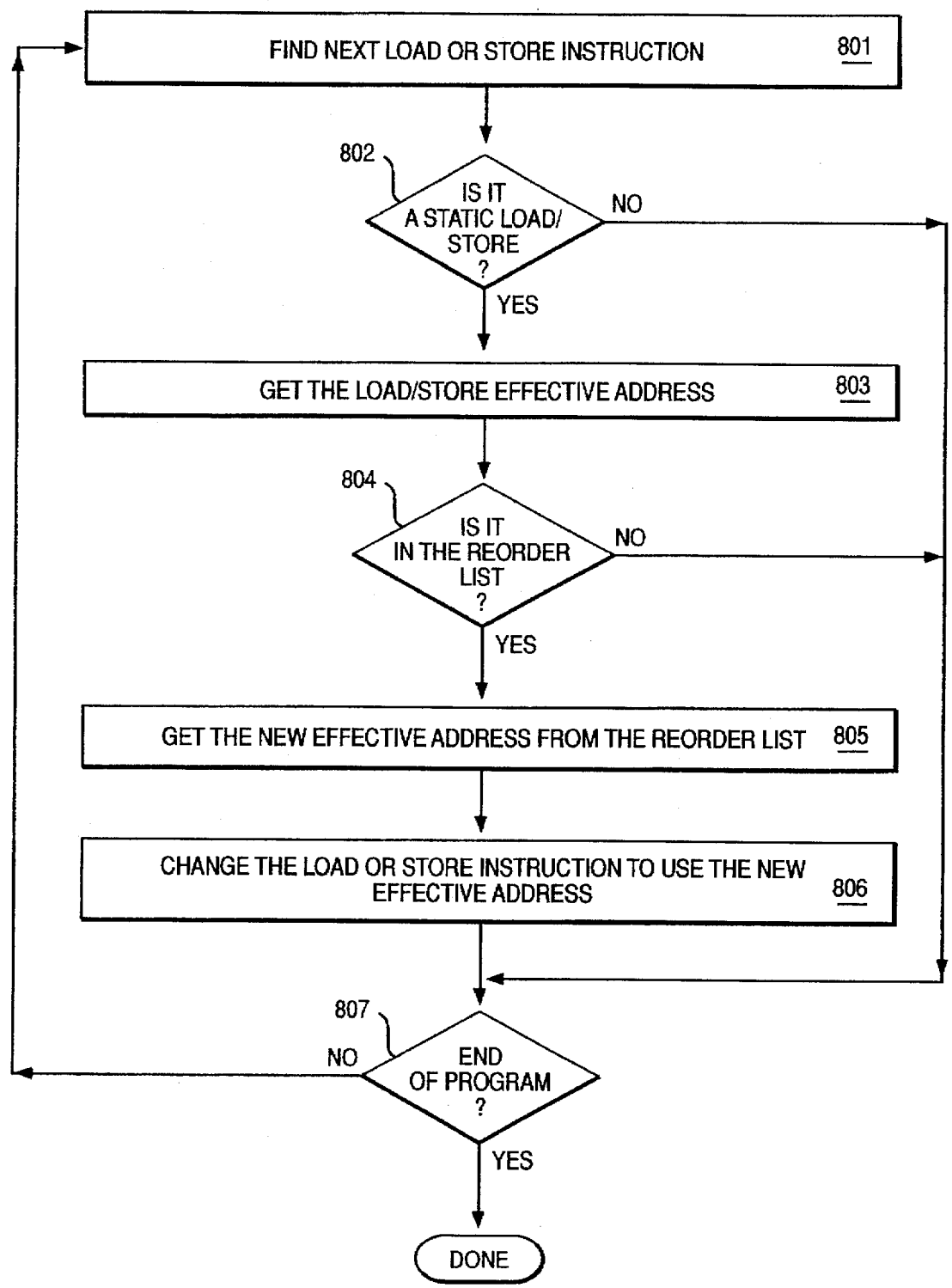
FIG. 8 is a flow chart which describes the data reordering procedure.

The postprocessor then reorders the program (505) as shown in FIG. 8. Starting at the beginning of the instruction section in the original program, at 801, the postprocessor scans the program until it locates the first l/s instruction. At 802, the postprocessor examines the l/s instruction to determine if it has a statically resolvable reference address. A statically resolvable reference address (i.e. effective address value) is one that can be determined simply by examining the instruction. As such, it does not use the contents of a register (which may be unknown until calculate the calculate the effective address.

If not a statically resolvable reference address, the instruction cannot be reordered and processing continues at 807. If the instruction is a static l/s, then processing continues at 803. At 803, the processor extracts/calculates the effective address of the l/s instruction (which is referred to as "oaddr") by reading the effective address bits in the address field of that instruction. The postprocessor scans the reorder list (created at 504) for address oaddr. If it is not found, processing continues at 807.

Otherwise, at 805, the postprocessor reads the new address for address oaddr from the reorder list (referred to as naddr). At 806, the postprocessor modifies the l/s instruction in the program to use the new reference address naddr. At 807, if there are more instructions in the program, processing continues at 801. Otherwise, reordering is complete and the postprocessor saves the reordered program (506).

FIG. 9 illustrates an example of reordering the data references for a simple code sequence. In FIG. 9a, the original data memory address allocation is shown for three data variables: D1 at address 0×100, D2 at address 0×200, and D3 at address 0×300. The code sequence, shown in FIG. 9b, references data variables D1, D2, and D3 in a tight loop. The postprocessor instruments the program, which ultimately generates the data reorder list shown in FIG. 9c. Using this reorder list, the postprocessor changes the original l/s instruction reference addresses from 0×100 to 0×180, 0×200 to 0×184, and 0×300 to 0×188, as shown in FIG. 9e.

Assuming the original data references D1, D2, and D3 all map to the same data cache address, the original program requires 32 cycles per loop iteration (assuming 1 cycle/ instruction and 10 cycles/cache miss) due to the cache miss that occurs for each memory reference. The reordered program shown in FIG. 9e executes in 5 cycles per loop iteration, which represents a 6.4× increase in performance.

While the invention has been shown and described with reference to particular embodiments thereof, it will be understood by those skilled in the art that the foregoing and other changes in form and detail may be made therein without departing from the spirit and scope of the invention, which is defined only by the following claims.

We claim:

1. A computer implemented process for directing a computer system having at least a processor, memory, and user controls, to optimize a program at the object code level, said program having memory references, comprising the steps of:

instrumenting each of said memory references to create an instrumented program by:
   setting a pointer to an address;
   scanning said program to detect one of said memory references;
   replacing said memory reference with a branch to said pointer;
   generating instrumentation code at said pointer;
   generating said memory reference; and
   repeating said above steps until all of said memory references have been instrumented;

executing said instrumented program to capture effective address trace data for each of said memory references;

analyzing access patterns of said effective address trace data;

in response to said analyzing step, reordering said memory references to create an optimized program.

2. The process according to claim 1 wherein said step of generating instrumentation code comprises the steps of:
   saving contents of at least one register;
   loading an address for a trace buffer into said memory;
   storing an effective address of said memory reference into said trace buffer;
   incrementing said address of said trace buffer; and
   restoring said contents of said at least one register.

3. The process according to claim 1 wherein said analyzing step comprises the step of:
   generating a directed flow graph from said effective address trace data to indicate access patterns of said effective address trace data.

4. The process according to claim 3 wherein said analyzing step further comprises the steps of:
   from said directed flow graph, generating a reorder list, said reorder list comprising said effective address trace data positioned in sequential order from the most frequent to the least frequent number of executions; and
   generating a new effective address for each of said effective address trace data.

5. The process according to claim 4 wherein said memory references comprise a store or load instruction.

6. The process according to claim 4 wherein said reordering step comprises the steps of:
   scanning said program for one of said memory references;
   determining if said memory reference is static;
   in response to said memory reference being static, determining an effective address for said memory reference;
   searching said reorder list for said effective address; and
   in response to finding said effective address in said reorder list, changing said effective address of said memory reference to said new effective address.

7. A computer system having at least a processor, memory, and user controls, to optimize a program at the object code level, said program having memory references, comprising:

a processor;

memory;

means for controlling said processor to instrument each of said memory references to create an instrumented program including:

means for setting a pointer to an address;

means for scanning said program to detect at least one of said memory references;

means for replacing said memory reference with a branch to said pointer;

means for generating instrumentation code at said pointer; and means for generating said memory reference;

means for controlling said processor to execute said instrumented program to capture effective address trace data for each of said memory references;

means for controlling said processor to analyze access patterns of said effective address trace data; and in response to analyzing said access patterns, means for controlling said processor to reorder said memory references to create an optimized program.

8. The system according to claim 7 wherein said means for generating instrumentation code comprises:

means for saving contents of at least one register;

means for loading an address for a trace buffer into said memory;

means for storing an effective address of said memory reference into said trace buffer;

means for incrementing said address of said trace buffer; and means for restoring said contents of said at least one register.

9. The system according to claim 7 wherein said means for analyzing comprises:

means for generating a directed flow graph from said effective address trace data to indicate access patterns of said effective address trace data.

10. The system according to claim 9 wherein said means for analyzing further comprises:

from said directed flow graph, means for generating a reorder list, said reorder list comprising said effective address trace data positioned in sequential order from the most frequent to the least frequent number of execution; and means for generating a new effective address for each of said effective address trace data.

11. The system according to claim 10 wherein said memory references comprise a store or load instruction.

12. The system according to claim 10 wherein said means for reordering comprises:

means for scanning said program for one of said memory references;

means for determining if said memory reference is static;

in response to said memory reference being static, means for determining an effective address for said memory reference;

means for searching said reorder list for said effective address; and in response to finding said effective address in said reorder list, means for changing said effective address of said memory reference to said new effective address.

\* \* \* \* \*

UNITED STATES PATENT AND TRADEMARK OFFICE
CERTIFICATE OF CORRECTION

PATENT NO. : 5,689,712
DATED : Nov. 18, 1997
INVENTOR(S) : Heisch

It is certified that error appears in the above-indentified patent and that said Letters Patent is hereby corrected as shown below:

Column 5, line 33: change "calculate the" to --runtime) to--.

Signed and Sealed this

Seventeenth Day of March, 1998

Attest:

BRUCE LEHMAN

Attesting Officer

Commissioner of Patents and Trademarks